(12) United States Patent
Lee et al.

(10) Patent No.: US 11,528,109 B2
(45) Date of Patent: Dec. 13, 2022

(54) METHOD AND APPARATUS FOR TRANSMITTING/RECEIVING SIGNAL IN WIRELESS COMMUNICATION SYSTEM

(71) Applicant: Samsung Electronics Co., Ltd., Gyeonggi-do (KR)

(72) Inventors: Hyojin Lee, Seoul (KR); Byungju Lee, Gyeonggi-do (KR); Juho Lee, Gyeonggi-do (KR); Younsun Kim, Gyeonggi-do (KR); Junghyun Kim, Gyeonggi-do (KR); Sangyeob Jung, Seoul (KR)

(73) Assignee: Samsung Electronics Co., Ltd

( * ) Notice: Subject to any disclaimer, the term of this patent is extended or adjusted under 35 U.S.C. 154(b) by 95 days.

(21) Appl. No.: 17/045,369

(22) PCT Filed: Apr. 12, 2018

(86) PCT No.: PCT/KR2018/004268
§ 371 (c)(1),
(2) Date: Oct. 5, 2020

(87) PCT Pub. No.: WO2019/194339
PCT Pub. Date: Oct. 10, 2019

(65) Prior Publication Data
US 2021/0167910 A1 Jun. 3, 2021

(30) Foreign Application Priority Data
Apr. 5, 2018 (KR) .................. 10-2018-0039604

(51) Int. Cl.
*H04L 5/00* (2006.01)
*H04L 27/26* (2006.01)
*H04W 72/04* (2009.01)

(52) U.S. Cl.
CPC .......... *H04L 5/0048* (2013.01); *H04L 5/0007* (2013.01); *H04L 27/2613* (2013.01); *H04W 72/042* (2013.01)

(58) Field of Classification Search
CPC . H04L 5/0048; H04L 5/0007; H04L 27/2613; H04W 72/042
See application file for complete search history.

(56) References Cited

U.S. PATENT DOCUMENTS

2008/0253400 A1 10/2008 Carroll
2013/0315321 A1 11/2013 Rajagopal et al.
(Continued)

FOREIGN PATENT DOCUMENTS

KR 1020180049750 5/2018
KR 1020180049974 5/2018
(Continued)

OTHER PUBLICATIONS

European Search Report dated Mar. 18, 2021 issued in counterpart application No. 18913823.3-1231, 8 pages.
(Continued)

*Primary Examiner* — Duc C Ho
(74) *Attorney, Agent, or Firm* — The Farrell Law Firm, P.C.

(57) ABSTRACT

Disclosed are: a communication technique for merging, with IoT technology, a 5G communication system for supporting a data transmission rate higher than that of a 4G system; and a system therefor. The present disclosure can be applied to intelligent services (for example, smart home, smart building, smart city, smart car or connected car, healthcare, digital education, retail, security, and safety-related services, and the like) on the basis of 5G communication technology and IoT-related technology. Disclosed are a method and an apparatus for transmitting a signal by using a non-orthogo-
(Continued)

nal frequency division multiplexing (NOFDM) scheme and, particularly, the present invention presents a method and an apparatus for transmitting a control signal and a reference signal by using an OFDM scheme and for transmitting data by using the NOFDM scheme.

15 Claims, 15 Drawing Sheets

(56) References Cited

U.S. PATENT DOCUMENTS

| | | |
|---|---|---|
| 2015/0304146 A1 | 10/2015 | Yang et al. |
| 2017/0078973 A1 | 3/2017 | Oh Watari et al. |
| 2017/0085347 A1* | 3/2017 | Fattouche ......... H04L 27/26416 |
| 2017/0230207 A1 | 8/2017 | Holguin-Sanchez |
| 2018/0070265 A1 | 3/2018 | Seo et al. |
| 2018/0115445 A1 | 4/2018 | Wilhelmsson et al. |
| 2019/0281610 A1 | 9/2019 | Choi et al. |

FOREIGN PATENT DOCUMENTS

| | | | |
|---|---|---|---|
| WO | WO-2011005533 A2 * | 1/2011 | ........... H04B 7/0413 |
| WO | WO2017167376 | 10/2017 | |

OTHER PUBLICATIONS

PCT/ISA/210 Search Report issued on PCT/KR2018/004268, dated Jan. 3, 2019, pp. 5.

PCT/ISA/237 Written Opinion issued on PCT/KR2018/004268, dated Jan. 3, 2019, pp. 5.

* cited by examiner

- PRIOR ART -

- PRIOR ART -

- PRIOR ART -

- PRIOR ART -

METHOD AND APPARATUS FOR TRANSMITTING/RECEIVING SIGNAL IN WIRELESS COMMUNICATION SYSTEM

PRIORITY

This application is a National Phase Entry of PCT International Application No. PCT/KR2018/004268 which was filed on Apr. 12, 2018, and claims priority to Korean Patent Application No. 10-2018-0039604, which was filed on Apr. 5, 2018, the content of each of which is incorporated herein by reference.

TECHNICAL FIELD

The disclosure relates to a method and an apparatus for transmitting and receiving a signal including information in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

It is premised that a 5G system, which is currently under development, uses an orthogonal frequency-division multiplexing (OFDM) scheme that avoids interference between carriers in downlink signal transmission.

DESCRIPTION OF INVENTION

Technical Problem

However, carrier spacing is already determined in the OFDM scheme, and thus the OFDM scheme has a problem of a limitation on an amount of data that can be transmitted through one OFDM symbol. In order to solve the problem, a data transmission method using a non-orthogonal frequency division multiplexing (NOFDM) scheme is suggested.

Solution to Problem

In accordance with an aspect of the disclosure, a method of transmitting a signal by an eNB is provided. The method includes: identifying whether to use non-orthogonal frequency-division multiplexing (NOFDM) in downlink data transmission; and, when it is identified to use NOFDM in the downlink data transmission, transmitting downlink control information and a reference signal to a UE through orthogonal frequency-division multiplexing (OFDM) and transmitting downlink data through the NOFDM or the OFDM. The method may further include transmitting an RRC message including information indicating that the NOFDM is used in the downlink data transmission by the eNB to the UE, and the reference signal may include at least one of a demodulation reference signal (DMRS) and a channel state information reference signal (CSI-RS).

When the downlink control information or the reference signal is mapped to a symbol in which downlink data is transmitted, the OFDM may be used for transmission of the downlink data mapped to the symbol, and when the downlink control information or the reference signal is not mapped to the symbol in which the downlink data is transmitted, the NOFDM may be used for transmission of the downlink data mapped to the symbol, and NOFDM subcarrier spacing is determined based on OFDM subcarrier spacing and a squeezing factor.

In accordance with another aspect of the disclosure, a method of receiving a signal by a UE is provided. The method includes: identifying whether to use non-orthogonal frequency-division multiplexing (NOFDM) in downlink data reception; and when it is identified to use NOFDM in the downlink data reception, receiving downlink control information and a reference signal from an eNB through orthogonal frequency-division multiplexing (OFDM) and receiving downlink data through the NOFDM or the OFDM.

In accordance with another aspect of the disclosure, an eNB for transmitting a signal is provided. The eNB includes: a transceiver; and a controller, connected to the transceiver and configured to perform control to identify whether to use non-orthogonal frequency-division multiplexing (NOFDM) in downlink data transmission, and when it is identified to use NOFDM in the downlink data transmission, transmit downlink control information and a reference signal to a UE through orthogonal frequency-division multiplexing (OFDM) and transmitting downlink data through the NOFDM or the OFDM.

In accordance with another aspect of the disclosure, a UE for receiving a signal is provided. The UE includes: a transceiver; and a controller connected to the transceiver and configured to perform control to identify whether to use non-orthogonal frequency-division multiplexing (NOFDM) in downlink data reception, and when it is identified to use NOFDM in downlink data reception, receive downlink control information and a reference signal from an eNB through orthogonal frequency-division multiplexing (OFDM) and receive downlink data through the NOFDM or the OFDM.

Advantageous Effects of Invention

According to the disclosure, it is possible to transmit a larger amount of data by more efficiently using frequency resources compared to the conventional transmission method using an OFDM scheme by transmitting data through an NOFDM scheme.

BRIEF DESCRIPTION OF DRAWINGS

Brief Description of the Drawings

Figure 1:
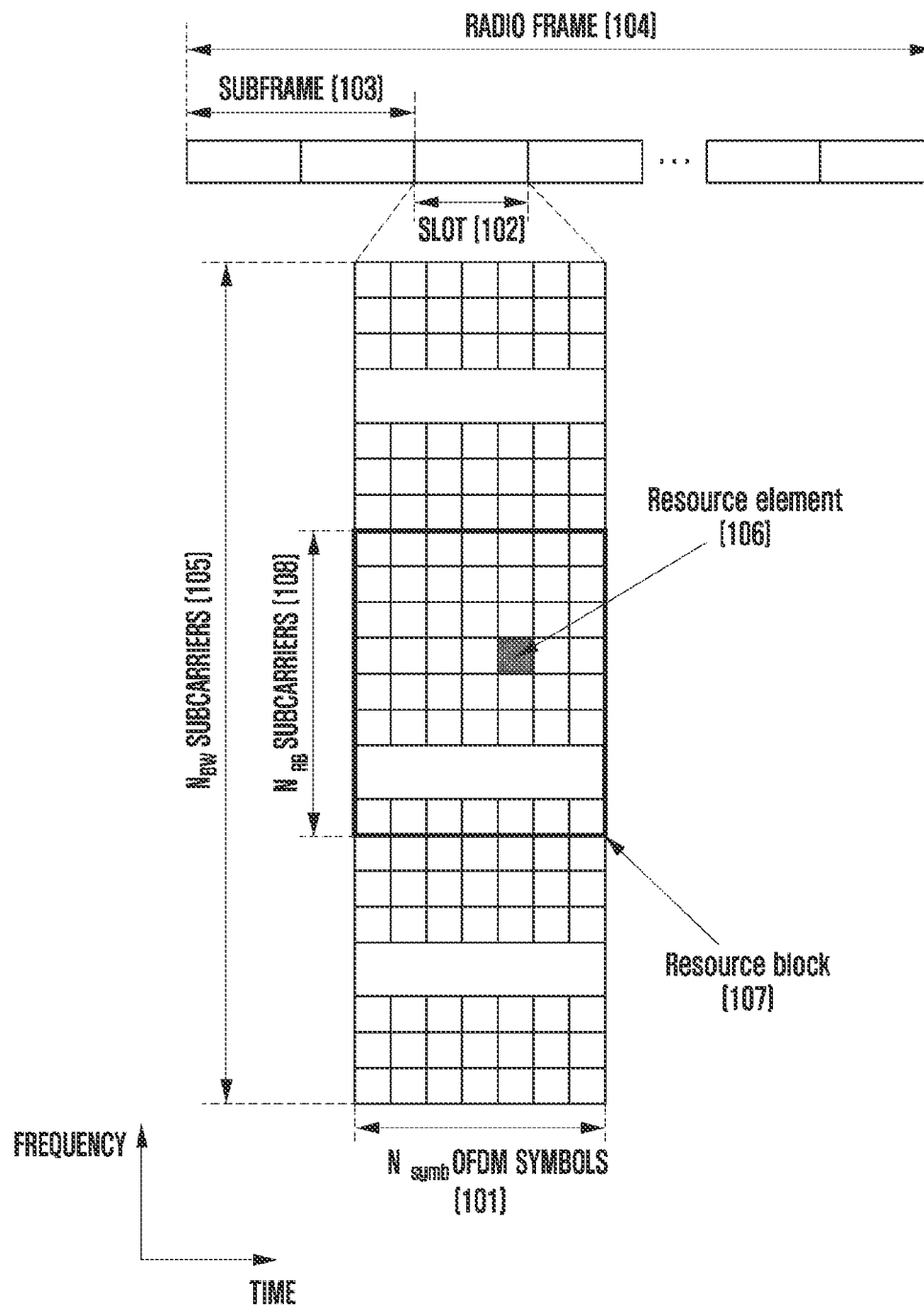
Figure 2:
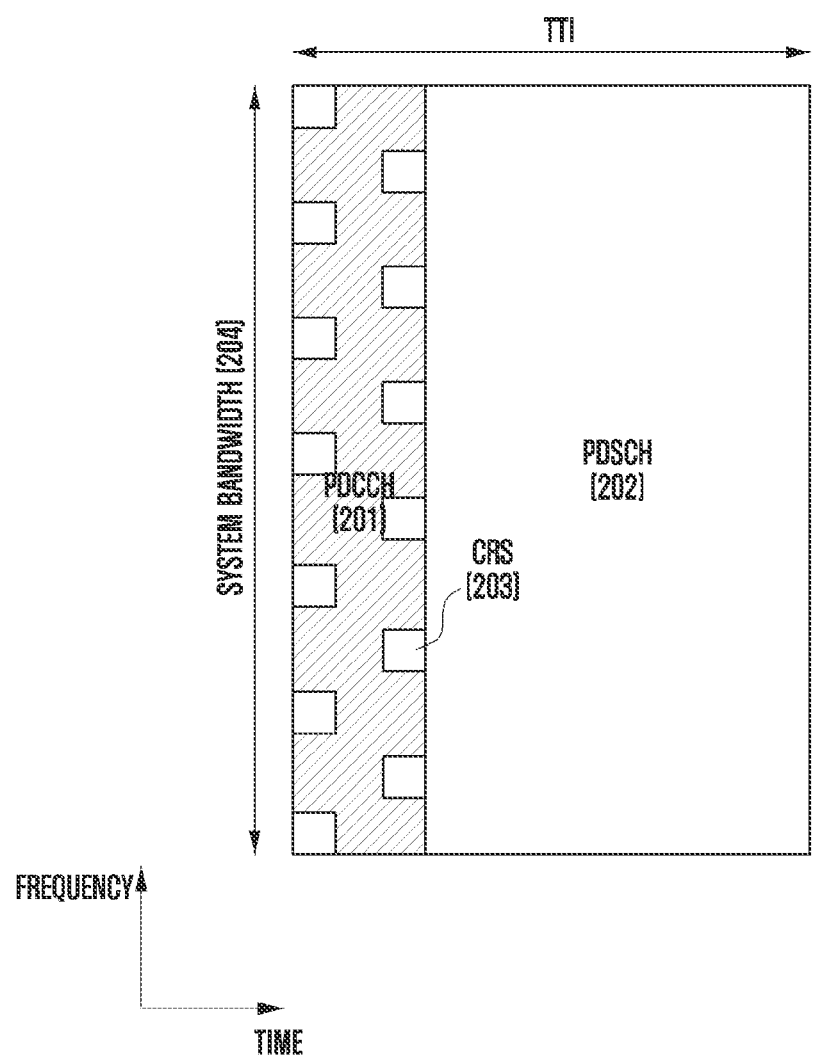
Figure 3:
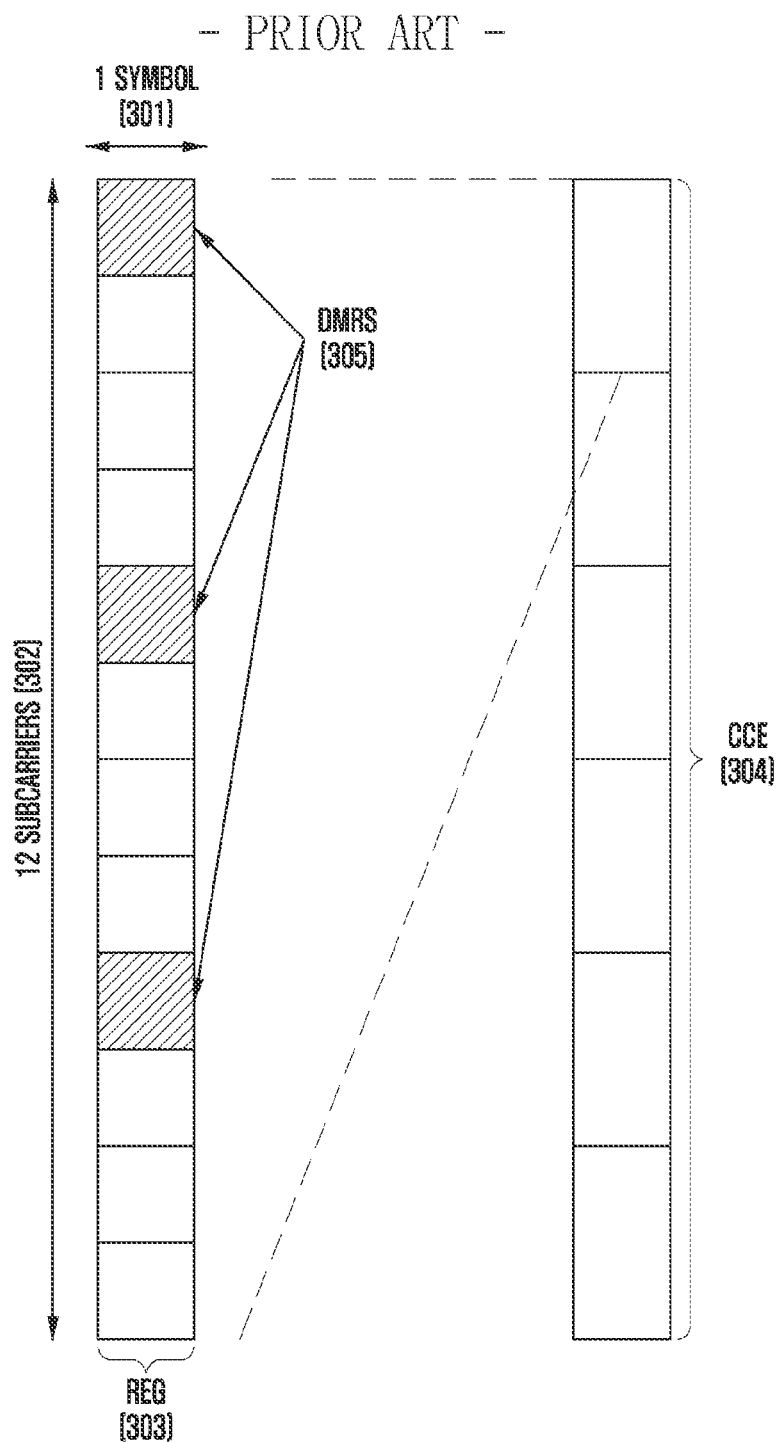
Figure 4:
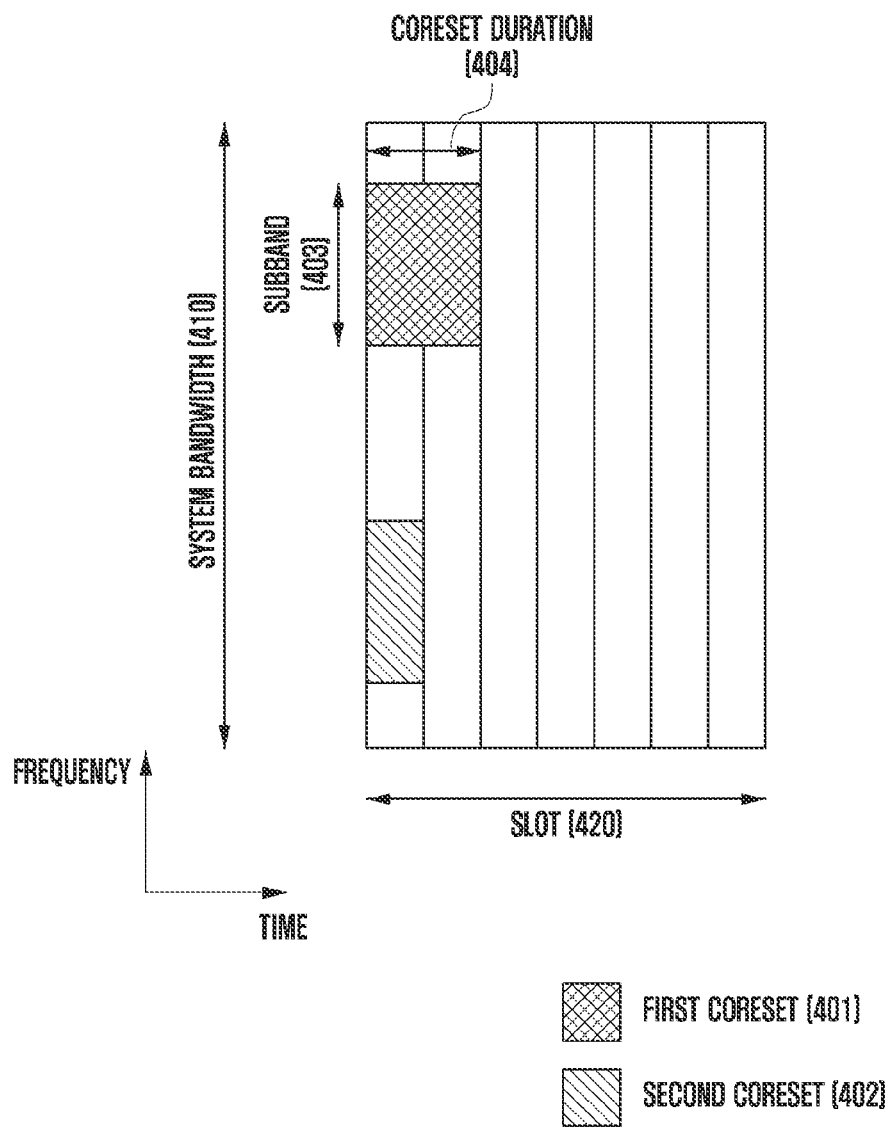
Figure 5:
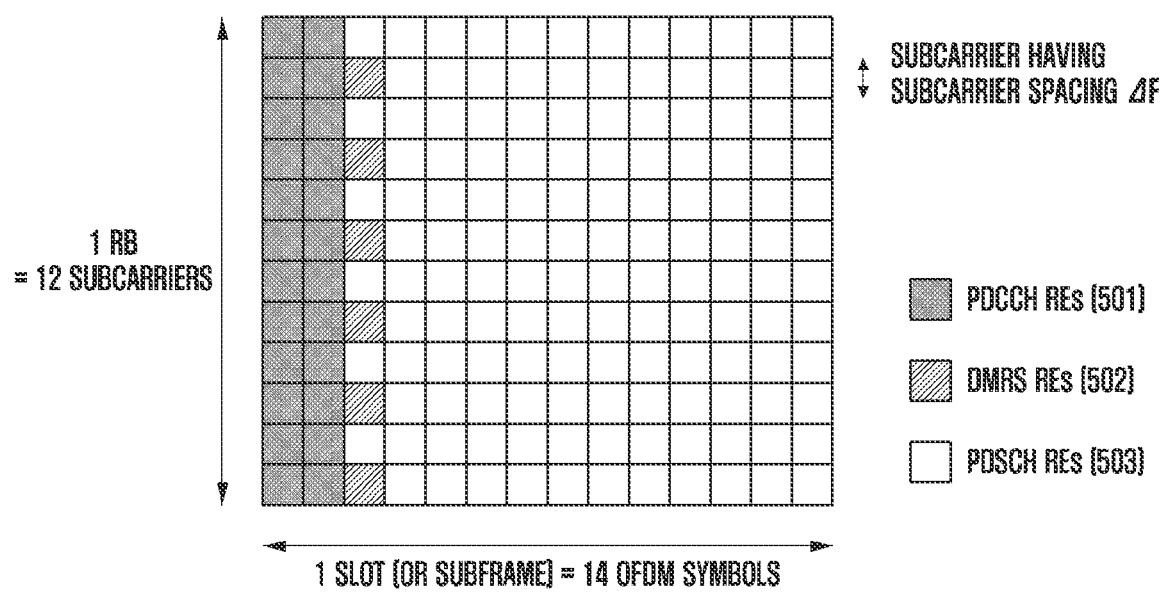
Figure 6:
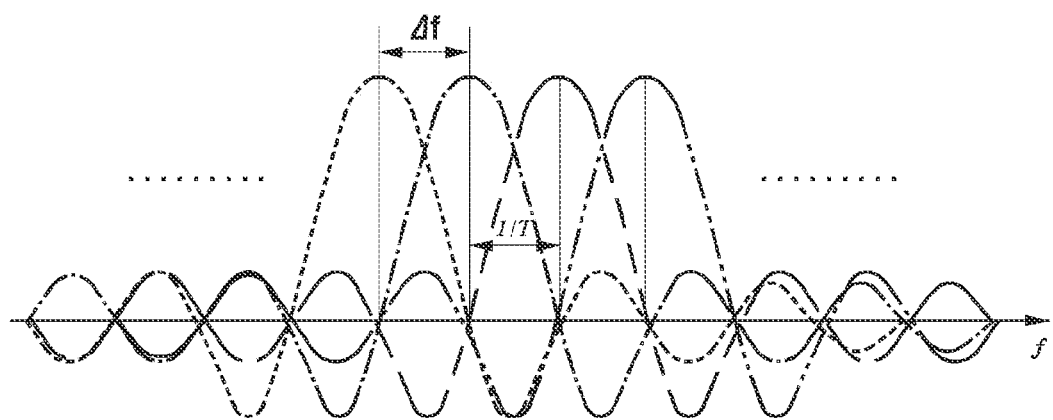
Figure 7:
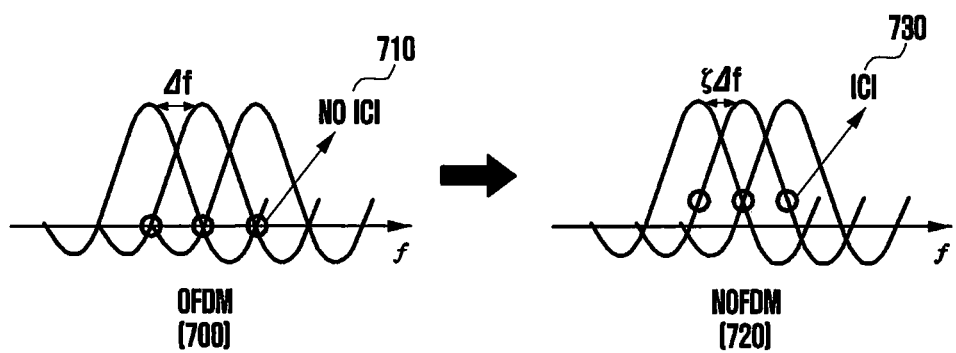
Figure 8:
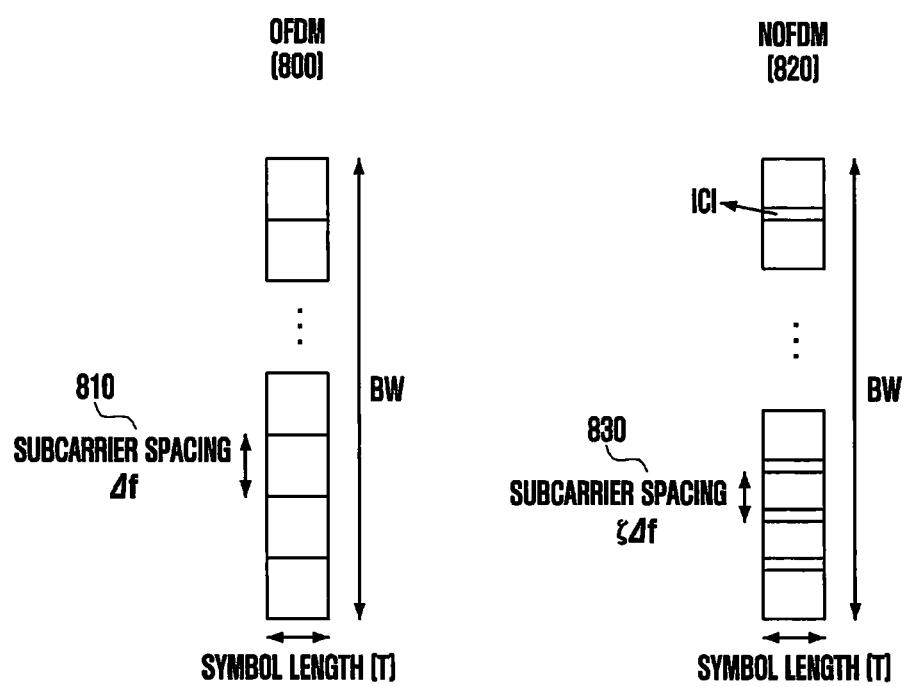
Figure 9:
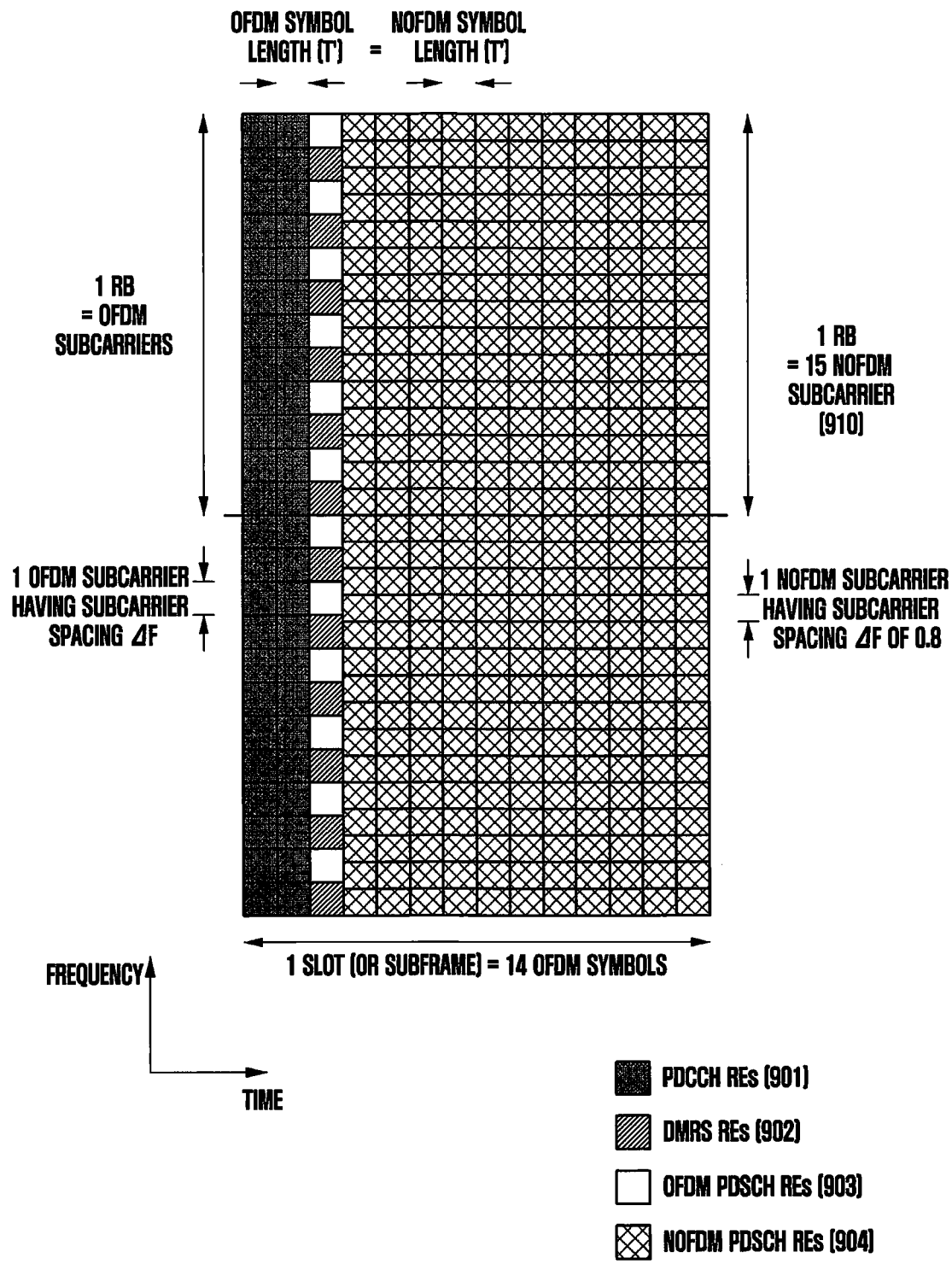
Figure 10:
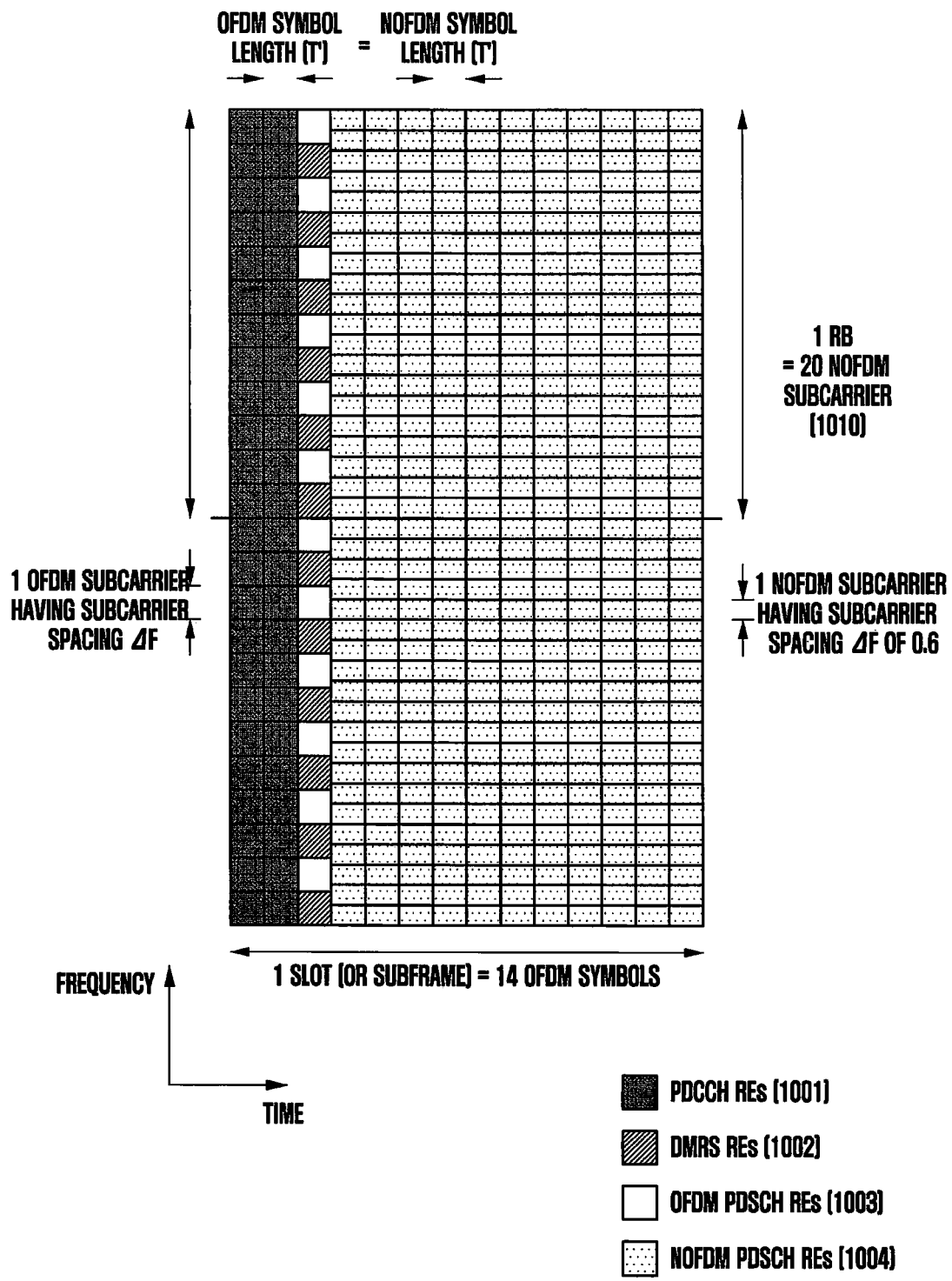
Figure 11:
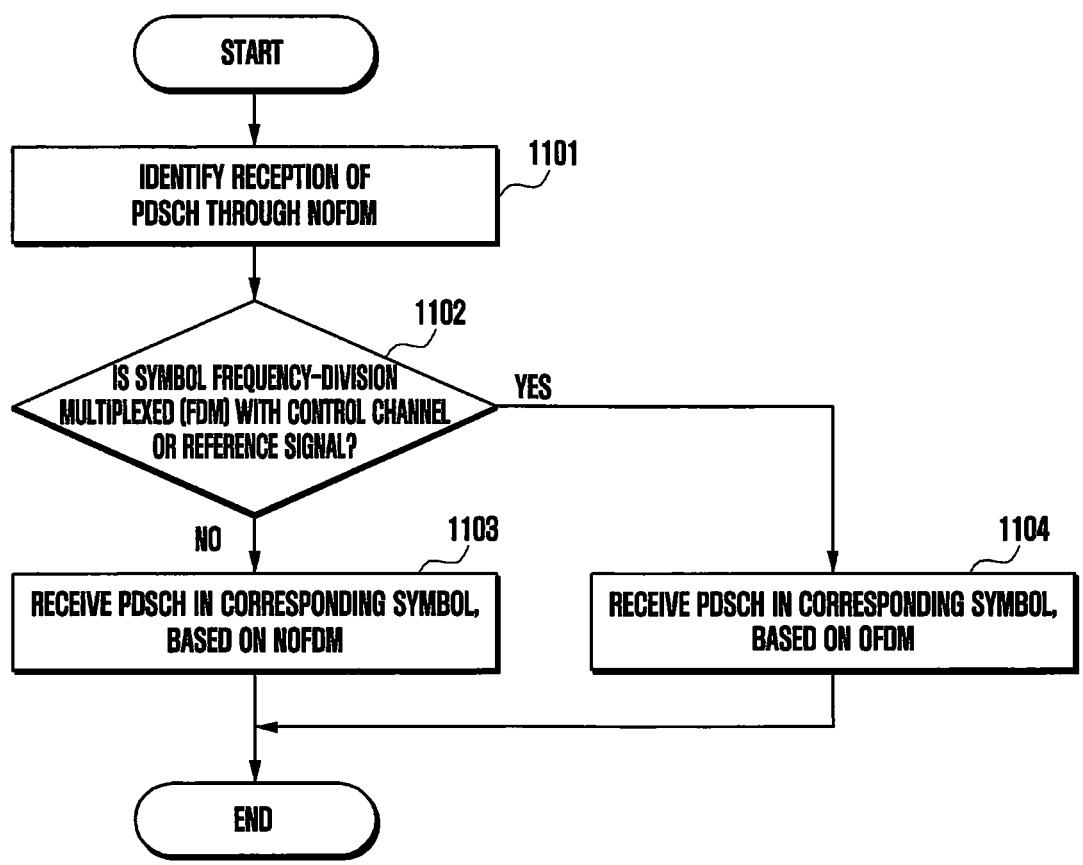
Figure 12:
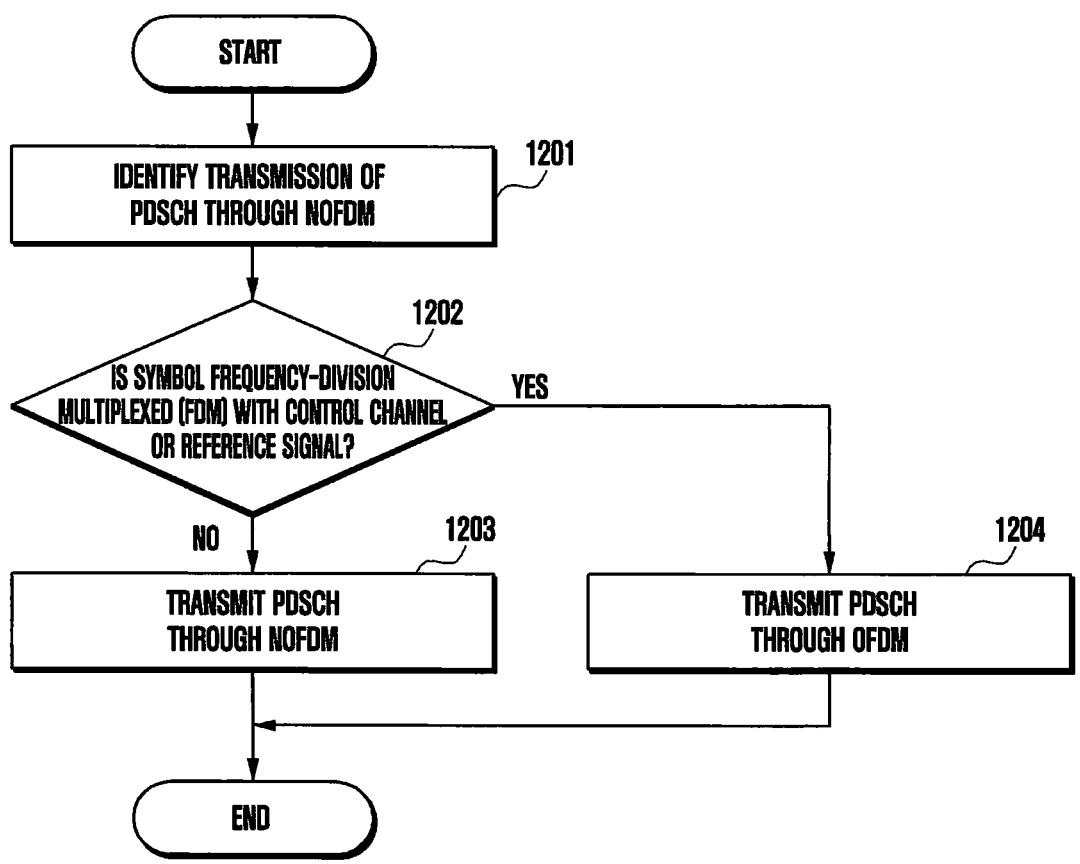
Figure 13:
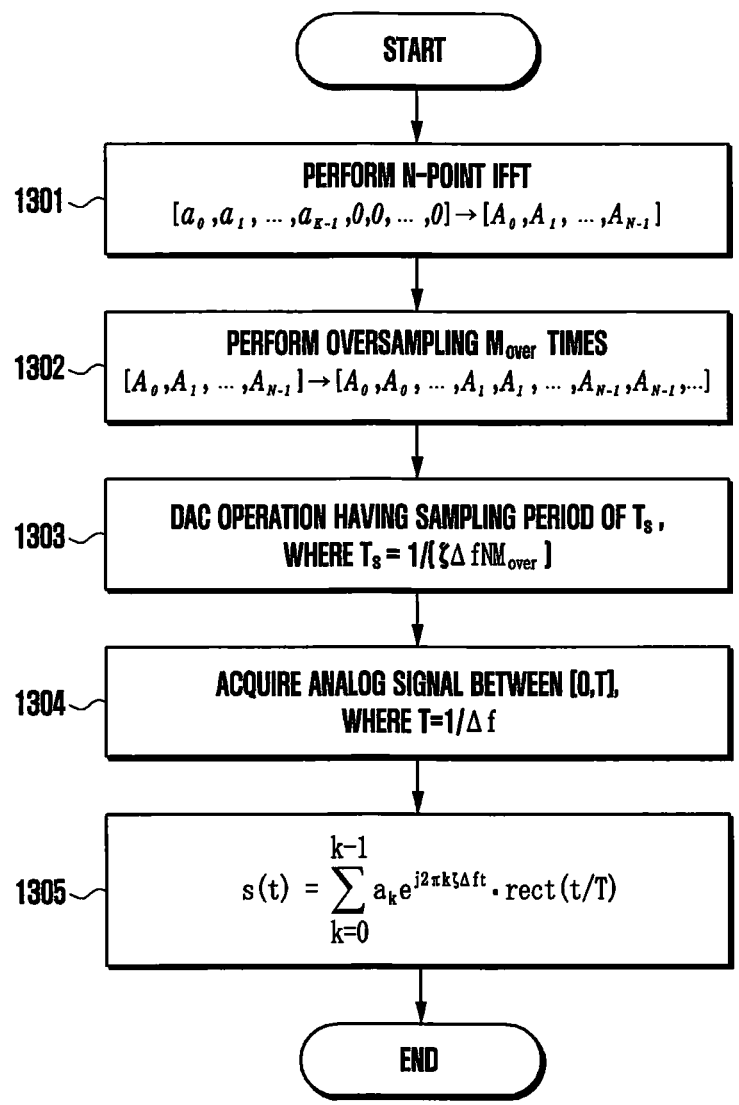
Figure 14:
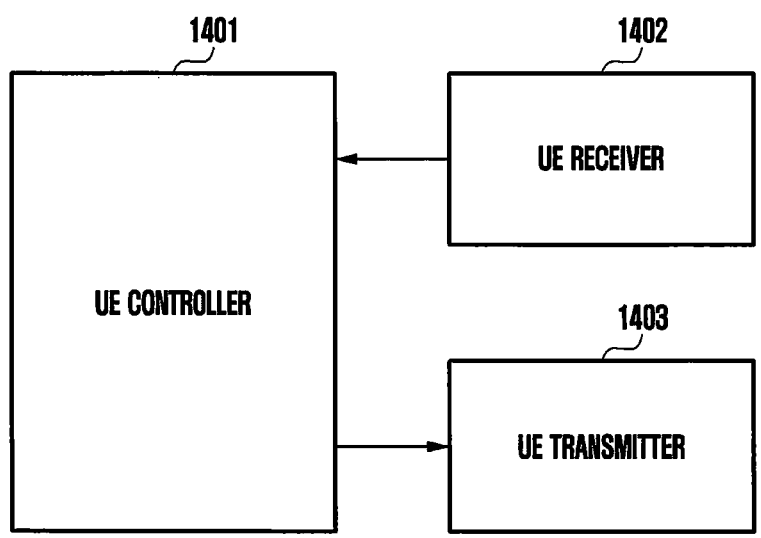
Figure 15:
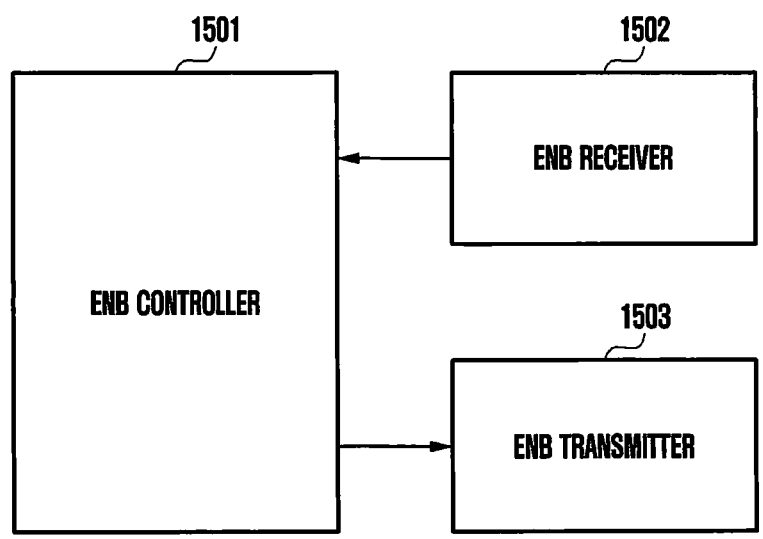

FIG. 1 illustrates the basic structure of time and frequency domains in LTE;

FIG. 2 illustrates a downlink control channel in LTE;

FIG. 3 illustrates transmission resources of a downlink control channel in 5G;

FIG. 4 illustrates an example of the configuration of a CORESET in 5G;

FIG. 5 illustrates an example of the configuration for a downlink RB structure in 5G;

FIG. 6 illustrates a frequency-axis signal function of OFDM;

FIG. 7 illustrates a frequency-axis signal difference between an NOFDM signal and an OFDM signal;

FIG. 8 illustrates symbol interval interference between an NOFDM signal and an OFDM signal;

FIG. 9 illustrates an RB structure when an NOFDM signal having a squeezing factor of 0.8 and an OFDM signal are time-multiplexed;

FIG. 10 illustrates an RB structure when an NOFDM signal having a squeezing factor of 0.6 and an OFDM signal are time-multiplexed;

FIG. 11 illustrates an operation in which a UE receives a PDSCH according to an embodiment of the disclosure;

FIG. 12 illustrates an operation in which an eNB transmits a PDSCH according to an embodiment of the disclosure;

FIG. 13 illustrates an operation of a transmitter for generating an OFDM or NOFDM signal;

FIG. 14 is a block diagram illustrating the internal structure of a UE according to an embodiment of the disclosure; and FIG. 15 is a block diagram illustrating the internal structure of an eNB according to an embodiment of the disclosure.

MODE FOR THE INVENTION

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system has developed into a broadband wireless communication system that provides high-speed and high-quality packet data service according to communication standards such as high-speed packet access (HSPA) of 3GPP, long-term evolution (LTE) or evolved universal terrestrial radio access (E-UTRA), LTE-advanced (LTE-A), high rate packet data (HRPD) of 3GPP2, ultra mobile broadband (UMB), and 802.16e of IEEE, or the like, beyond the initially provided voice-based service.

An LTE system, which is a representative example of the broadband wireless communication system, employs an orthogonal frequency-division multiplexing (OFDM) scheme for a downlink (DL), and employs a single-carrier frequency-division multiple access (SC-FDMA) scheme for an uplink (UL). The uplink is a radio link through which a user equipment (UE) (or a mobile station (MS)) transmits data or a control signal to an eNode B (eNB) (or a base station (BS)), and the downlink is a radio link through which the eNB transmits data or a control signal to the UE. In such a multi-access scheme, time-frequency resources for carrying data or control information are allocated and operated in a manner that prevents overlapping of resources, that is, that establishes orthogonality between users so as to identify data or control information of each user.

A post-LTE communication system, that is, a 5G communication system, is required to be able to freely reflect the various requirements of a user and a service provider, and thus it is required to support a service which satisfies the various requirements. Services considered for implementation in the 5G communication system include enhanced mobile broadband (eMBB), massive machine-type communication (mMTC), and ultra-reliability low-latency communication (URLLC).

The eMBB aims to provide a data transmission rate which is improved so as to surpass the data transmission speed supported by LTE, LTE-A, or LTE-Pro. For example, in the 5G communication system, the eMBB is required to provide a peak downlink data rate of 20 Gbps and a peak uplink data rate of 10 Gbps from the viewpoint of a single base station. Further, the 5G communication system should provide not only the peak data rate but also an increased user-perceived data rate. In order to satisfy these requirements, improvement of various transmission/reception technologies, including further improved multi-input multi-output (MIMO) transmission technology, is needed. Further, while the current LTE system uses transmission bandwidths from a bandwidth of 2 GHz to a maximum bandwidth of 20 MHz to transmit signals, the 5G communication system uses a frequency bandwidth wider than 20 MHz in frequency bands of 3 to 6 GHz or greater than or equal to 6 GHz, whereby the data transmission rate required by the 5G communication system can be satisfied.

Also, in order to support an application service such as the Internet of Things (IoT), mMTC is considered for implementation in the 5G communication system. mMTC is required to support access by massive numbers of UEs within a cell, improve coverage of the UE, increase a battery lifetime, and reduce the costs of the UE in order to efficiently provide the IoT. The IoT is attached to various sensors and devices to provide a communication function, and thus should support a large number of terminals (for example, 1,000,000 terminals/km$^2$) within a cell. Further, since the UE supporting mMTC is highly likely to be located in a shade area, such as a basement, which a cell cannot cover due to the service characteristics thereof, the mMTC requires wider coverage than other services supported by the 5G communication system. The UE supporting mMTC needs to be produced at low cost, and it is difficult to frequently exchange a battery thereof, so a very long battery lifetime, for example, 10 to 15 years, is required.

Last, the URLLC is a cellular-based wireless communication service used for a particular (mission-critical) purpose. For example, services used for remote control of robots or machinery, industrial automation, unmanned aerial vehicles, remote health care, and emergency alerts may be considered. Accordingly, communication provided by the URLLC should provide very low latency and very high reliability. For example, the service supporting URLLC should satisfy a radio access delay time (air interface latency) shorter than 0.5 milliseconds and also should satisfy requirements of a packet error rate lower than or equal to $10^{-5}$. Accordingly, for services supporting URLLC, the 5G system should provide a transmit time interval (TTI) smaller than that of other services, and is also required to be designed to allocate wide resources in a frequency band in order to guarantee the reliability of a communication link.

Three services of 5G, namely eMBB, URLLC, and mMTC, may be multiplexed and transmitted in one system. In order to satisfy different requirements of the respective services, the services may use different transmission/reception schemes and transmission/reception parameters.

Hereinafter, the frame structure of the LTE and LTE-A systems will be described in more detail with reference to the drawings.

FIG. 1 illustrates the basic structure of time and frequency domains, which are radio resource regions in which data or a control channel is transmitted in an LTE system.

In FIG. 1, the horizontal axis indicates a time domain and the vertical axis indicates a frequency domain. A minimum transmission unit in the time domain is an OFDM symbol. One slot 102 consists of $N_{symb}$ OFDM symbols 101 and one subframe 103 consists of 2 slots. The length of one slot is 0.5 ms, and the length of one subframe is 1.0 ms. A radio frame 104 is a time-domain unit consisting of 10 subframes. The minimum transmission unit in the frequency domain is a subcarrier, and the bandwidth of the entire system transmission band consists of a total of $N_{BW}$ subcarriers 105. A basic unit of resources in the time and frequency domains is a resource element (RE) 106, and may be indicated by an OFDM symbol index and a subcarrier index. A resource block (RB or a physical resource block (PRB)) 107 is defined by $N_{symb}$ successive OFDM symbols 101 in the time domain and $N_{RB}$ successive subcarriers 108 in the frequency domain. Therefore, one RB 108 includes $N_{symb} \times N_{RB}$ REs 106. In general, the minimum transmission unit of data is the RB unit. In the LTE system, in general, $N_{symb}=7$ and $N_{RB}=12$. $N_{BW}$ is proportional to a system transmission bandwidth.

Below, downlink control information (DCI) in the LTE and LTE-A systems will be described in more detail.

In the LTE system, scheduling information of downlink data or uplink data is transmitted from the eNB to the UE through the DCI. The DCI is defined in various formats, and a DCI format is operated through the application of one of various predefined DCI formats depending on whether scheduling information is scheduling information of uplink data or downlink data, whether the DCI is compact DCI having small-sized control information, and whether spatial multiplexing using multiple antennas is applied, and the DCI is DCI for controlling power. For example, DCI format 1, corresponding to scheduling control information for downlink data, is configured to include the following control information.

Resource allocation type 0/1 flag: indicates whether a resource allocation type is type 0 or type 1. Type 0 applies a bitmap scheme and allocates resources in units of resource block groups (RBGs). In the LTE system, a basic scheduling unit is a resource block (RB), expressed by time and frequency domain resources, and an RBG includes a plurality of RBs and is used as a basic scheduling unit in type 0. Type 1 allows allocation of a predetermined RB in an RBG.

Resource block assignment: indicates RBs allocated to data transmission. Expressed resources are determined according to the system bandwidth and the resource allocation type.

Modulation and coding scheme (MCS): indicates a modulation scheme used for data transmission and the size of a transport block (TB), which is data to be transmitted.

HARQ process number: indicates a process number of HARQ.

New data indicator: indicates whether corresponding data corresponds to HARQ initial transmission or HARQ retransmission.

Redundancy version: indicates the redundancy version of HARQ.

Transmit power control (TPC) command for physical uplink control channel (PUCCH): indicates a transmission power control command for a PUCCH, which is an uplink control channel.

The DCI is transmitted through a physical downlink control channel (PDCCH), which is a downlink physical control channel, via a channel-coding and modulation process.

A cyclic redundancy check (CRC) bit is added to a DCI message payload and is scrambled with a radio network temporary identifier (RNTI) corresponding to the identity of the UE. Depending on the purpose of the DCI message, for example, UE-specific data transmission, a power control command, or a random access response, different RNTIs are used. That is, the RNTI is not explicitly transmitted, but is transmitted while being inserted into a CRC calculation process. If the DCI message transmitted through the PDCCH is received, the UE may identify the CRC through the allocated RNTI, and may recognize that the corresponding message is transmitted to the UE when the CRC is determined to be correct on the basis of the CRC identification result.

FIG. 2 illustrates a PDCCH, which is a downlink physical channel through which DCI in the LTE system is transmitted.

Referring to FIG. 2, a PDCCH 201 is time-division-multiplexed with a PDSCH 202, which is a data transmission channel, and is transmitted over an entire system bandwidth 204. The region of the PDCCH 201 is expressed by the number of OFDM symbols, and is indicated to the UE through a control format indicator (CFI) transmitted through a physical control format indicator channel (PCFICH). By allocating the PDCCH 201 to OFDM symbols on the front part of the subframe, the UE may decode downlink scheduling allocation information as soon as possible, and thus a decoding delay for a downlink shared channel (DL-SCH), that is, the total downlink transmission delay, may be reduced. One PDCCH carries one DCI message, and a plurality of terminals is simultaneously scheduled on the downlink and the uplink, so that transmission of a plurality of PDCCHs is simultaneously performed within each cell.

A cell-specific reference signal (CRS) 203 is used as a reference signal for decoding the PDCCH 201. The CRS 203 is transmitted in every subframe over the entire band, and scrambling and resource mapping applied to the CRS vary depending on a cell identity (ID). Since the CRS 203 is a reference signal used in common by all UEs, UE-specific beamforming cannot be used. Accordingly, a multi-antenna transmission scheme for the PDCCH in the LTE system is limited to open-loop transmit diversity. The number of antenna ports of the CRS is implicitly made known to the UE from decoding of a physical broadcast channel (PBCH).

Resource allocation of the PDCCH 201 is based on a control-channel element (CCE), and one CCE consists of 9 resource element groups (REGs), that is, a total of 36 resource elements (REs). The number of CCEs required for a particular PDCCH 201 may be 1, 2, 4, or 8, which varies depending on the channel-coding rate of the DCI message payload. As described above, different numbers of CCEs may be used to implement link adaptation of the PDCCH 201.

The UE is required to detect a signal while the UE is not aware of information on the PDCCH 201, so a search space indicating a set of CCEs is defined for blind decoding in the LTE system. Accordingly, the entire PDCCH region includes a set of CCs in a logical region. The search space includes a plurality of sets at an aggregation level (AL) of each CCE, which is not explicitly signaled but is implicitly defined through a function using a UE identity and a subframe number. In each subframe, the UE performs decoding on the PDCCH 201 with respect to all resource candidates that can be configured by CCEs within the set search space, and processes declared information valid for the corresponding UE through identification of the CRC.

The search space is divided into a UE-specific search space and a common search space. UEs in a predetermined group or all UEs may search for a common search space of the PDCCH 201 in order to receive cell-common control information, such as dynamic scheduling for system information or a paging message. For example, scheduling allocation information of the DL-SCH for transmission of system information block (SIB)-1 including service provider information of the cell may be received by searching for the common search space of the PDCCH 201.

In the LTE system, the search space for the PDCCH is defined as follows.

[The set of PDCCH candidates to monitor are defined in terms of search spaces, where a search space $S_k^{(L)}$ at aggregation level $L \in \{1,2,4,8\}$ is defined by a set of PDCCH candidates. For each serving cell on which PDCCH is monitored, the CCEs corresponding to PDCCH candidate L of the search space $S_k^{(L)}$ are given by $$L\{(Y_k+m') \bmod \lfloor N_{CCE,k}/L \rfloor\}+i$$

where $Y_k$ is defined below, i=0, ..., L−1. For the common search space m'=m. For the PDCCH UE-specific search space, for the serving cell on which PDCCH is monitored, if the monitoring UE is configured with carrier indicator field then m'=m+$M^{(L)} \cdot n_{CI}$ where $n_{CI}$ is the carrier indicator field value, else if the monitoring UE is not configured with carrier indicator field then m'=m, where m=0, ..., $M^{(L)}$−1. $M^{(L)}$ is the number of PDCCH candidates to monitor in the given search space.

Note that the carrier indicator field value is the same as ServCellIndex.

For the common search spaces, $Y_k$ is set to 0 for the two aggregation levels L=4 and L=8.

For the UE-specific search space $S_k^{(L)}$ at aggregation level L, the variable $Y_k$ is defined by $$Y_k=(A \cdot Y_{k-1}) \bmod D$$

where $Y_{-1}=n_{RNTI} \neq 0$, A=39827, D=65537 and k=$\lfloor n_s/2 \rfloor$, $n_s$ is the slot number within a radio frame.

The RNTI value used for $n_{RNTI}$ is defined in subclause 7.1 in downlink and subclause 8 in uplink.]

According to the definition of the search space for the PDCCH described above, the UE-specific search space is not explicitly signaled, but is implicitly defined through a function by a UE identity and a subframe number. That is, the UE-specific search space is changeable according to the subframe number, which means that the UE-specific search space is changeable according to the time. Thereby, a problem (defined as a blocking problem) in which a particular UE cannot use a search space due to other UEs is solved. If all CCEs that the UE finds have already been used by other UEs scheduled within the same subframe and thus the particular UE cannot be scheduled in the corresponding subframe, the search space is changed according to the time and thus this problem may be avoided in the subsequent subframe. For example, even though search spaces of a first UE and a second UE partially overlap each other in a specific subframe, a UE-specific search space is changed for each subframe, so it may be expected that overlapping in the subsequent subframe is different therefrom.

According to the definition of the search space for the PDCCH, since UEs in a predetermined group or all UEs are required to receive the PDCCH, the common search space is defined as a pre-appointed set of CCEs. That is, the common search space is not changed according to the UE identity or the subframe number. Although the common search space exists for transmission of various system messages, the common search space may be used to transmit control information of an individual UE. Accordingly, the common search space may be used as a solution for the case in which the UE cannot be scheduled since resources available in the UE-specific search space are insufficient.

The search space is a set of candidate control channels including CCEs for which the UE attempts decoding at a given aggregation level, and the UE has a plurality of search spaces since there is a plurality of aggregation levels making one group including 1, 2, 4, or 8 CCEs.

The number $M^{(L)}$ of PDCCH candidates that the UE within a search space ($S_k^{(L)}$) defined according to an aggregation level should monitor in the PDCCHs of the LTE system is defined as shown in [Table 1] below.

TABLE 1

| Type | Search space | | Number of PDCCH candidates |
|---|---|---|---|
| | Aggregation level | Size (in CCEs) | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In [Table 1] above, the UE-specific search space supports aggregation levels {1, 2, 4, 8} and has {6, 6, 2, 2} PDCCH candidates. The common search space supports aggregation levels {4, 8} and has {4, 2} PDCCH candidates, respectively. The reason why the common search space supports only aggregation levels {4, 8} is that coverage characteristics are generally good due to the use of sufficient resources when a system message reaches a cell edge.

DIC transmitted to the common search space is defined only for a system message or particular DCI formats, such as 0, 1A, 3, 3A, and 1C, corresponding to the purpose of power control for a UE group. In the common search space, a DCI format supporting spatial multiplexing is not supported. A downlink DCI format, which should be decoded in the UE-specific search space, varies depending on the transmission mode configured for the corresponding UE. Since the configuration of the transmission mode is performed through RRC signaling, a subframe number indicating when the corresponding configuration is valid for the corresponding UE is not accurately specified. Accordingly, the UE may operate to maintain communication by always decoding DCI format 1A regardless of the transmission mode.

Hereinafter, PDCCH transmission/reception may be interchangeable with DCI transmission/reception or downlink data transmission/reception on the PDSCH. Further, PUCCH transmission/reception may be interchangeable with uplink control information (UCI) transmission/reception on the PUCCH or uplink data on the PUSCH and/or UCI transmission/reception.

The method of transmitting and receiving the downlink control channel and downlink control information and the search space in the conventional LTE and LTE-A systems have been described.

Hereinafter, the downlink control channel in the 5G communication system that is currently under discussion will be described in more detail with reference to the drawings.

FIG. 3 illustrates an example of a basic unit of time and frequency resources included in a downlink control channel that can be used in the 5G system.

Referring to FIG. 3, a basic unit (REG) of time and frequency resources included in a control channel consists of 1 OFDM symbol 301 on the time axis and 12 subcarriers 302, that is, 1 RB on the frequency axis. When configuring the basic unit of the control channel, a data channel and a control channel may be time-division-multiplexed within one subframe on the basis of the assumption that a basic unit on the time axis is 1 OFDM symbol 301. It is easy to satisfy delay time requirements through a decrease in processing time of the user by placing the control channel ahead of the data channel. By configuring the basic unit of the control channel on the frequency axis as one RB 302, frequency division multiplexing (FDM) between the control channel and the data channel may be more efficiently performed.

Various sizes of control channel regions may be configured by concatenating REGs 303 illustrated in FIG. 3. For example, when a basic unit of allocation of the downlink control channel in the 5G system is a CCE 304, 1 CCE 304 may consist of a plurality of REGs 303. In the case of the REG 303 illustrated in FIG. 3, the REG 303 may consist of 12 REs, and if 1 CCE 304 consists of 6 REGs 303, 1 CCE 304 may consist of 72 REs. When the downlink control region is configured, the corresponding region may consist of a plurality of CCEs 304, and a specific downlink control channel may be mapped to one or a plurality of CCEs 304 according to an aggregation level within the control region and transmitted. CCEs 304 within the control region may be distinguished by numbers, and the numbers may be assigned according to a logical mapping scheme.

The basic unit of the downlink control channel illustrated in FIG. 3, that is, the REG 303, may include all of REs to which the DCI is mapped and the region to which a demodulation reference signal (DMRS) 305, which is a reference signal for decoding the REs, is mapped. As illustrated in FIG. 3, the DMRS 305 may be transmitted in 3 REs within 1 REG 303. The DMRS 303 is transmitted using precoding, such as a control signal mapped within the REG 303, and thus the UE can decode control information without any information on precoding applied by the eNB.

FIG. 4 illustrates an example of a control resource set (CORESET) in which a downlink control channel is transmitted in the 5G wireless communication system. In FIG. 4, 2 CORESETs (a first CORESET 401 and a second CORESET 402) are configured within a system bandwidth 410 on the frequency axis and 1 slot 420 on the time axis (it is assumed that 1 slot consists of 7 OFDM symbols in the example of FIG. 4). The CORESETs 401 and 402 may be configured to be located on a specific subband 403 within the entire system bandwidth 410 on the frequency axis. The CORESET may be configured as one or a plurality of OFDM symbols on the time axis, which may be defined as a control resource set duration 404. In the example of FIG. 4, the first CORESET 401 may be configured to have a CORESET length of 2 symbols, and the second CORESET 402 may be configured to have a CORESET length of 1 symbol.

The CORESET in the 5G system described above may be configured in the UE by the eNB through higher-layer signaling (for example, system information, a master information block (MB), or radio resource control (RRC) signaling). Configuration of the CORESET in the UE may mean provision of information on the location of the CORESET, the subband, resource allocation of the CORESET, and the CORESET length. For example, CORESET information provided to the UE may include the following information.

TABLE 2

Configuration information 1. RB allocation information on frequency axis
Configuration information 2. CORESET start symbol
Configuration information 3. CORESET symbol length
Configuration information 4. REG bundling size (2, 3, or 6)
Configuration information 5. Transmission mode (interleaved transmission type or non-interleaved transmission type)
Configuration information 6. DMRS configuration information (precoder granularity)
Configuration information 7. Search space type (common search space, group-common search space, and UE-specific search space)
Configuration information 8. DIC format to be monitored in corresponding CORESET
Others Various pieces of information required for transmitting a downlink control channel as well as the configuration information may be transmitted and configured in the UE.

Subsequently, downlink control information in the 5G system will be described in detail.

Scheduling information for uplink data transmitted through a physical uplink shared channel (PUSCH) or downlink data transmitted through a physical downlink shared channel (PDSCH) in the 5G system may be transferred from the eNB to the UE through DCI. The UE may monitor a fallback DCI format and a non-fallback DCI format for the PUSCH or the PDSCH. The fallback DCI format may be configured as a fixed field between the eNB and the UE, and the non-fallback DCI format may include a configurable field.

The fallback DCI for scheduling the PUSCH may include, for example, the information in [Table 3] below.

TABLE 3

Identifier for DCI formats - [1] bit
Frequency domain resource assignment - $[\lceil \log_2(N_{RB}^{UL,\,BWP}(N_{RB}^{UL,\,BWP} + 1)/2)\rceil]$ bits
Time domain resource assignment - X bits
Frequency hopping flag - 1 bit
Modulation and coding scheme - [5] bits
New data indicator - 1 bit
Redundancy version - [2] bits
HARQ process number -[4] bits
TPC command for scheduled PUSCH - [2] bits
UL (uplink)/SUL (supplementary uplink link) indicator - 0 or 1 bit The non-fallback DCI for scheduling the PUSCH may include, for example, the information in [Table 4] below.

TABLE 4

Carrier indicator - 0 or 3 bits
Identifier for DCI formats –[1] bits
Bandwidth part indicator - 0, 1, or 2 bits
Frequency domain resource assignment
   For resource allocation type 0, $\lceil N_{RB}^{UL,BWP}/P \rceil$ bits
   For resource allocation type 1, $\lceil \log_2(N_{RB}^{UL,BWP}(N_{RB}^{UL,BWP} + 1)/2) \rceil$ bits
Time domain resource assignment – 1, 2, 3, or 4 bits
VRB (virtual resource block)-to-PRB (physical resource block) mapping – 0 or 1 bit, only for resource allocation type 1
   0 bit if only resource allocation type 0 is configured;
   1 bit otherwise.
Frequency hopping flag – 0 or 1 bit, only for resource allocation type 1
   0 bit if only resource allocation type 0 is configured;
   1 bit otherwise.
Modulation and coding scheme – 5 bits
New data indicator – 1 bit
Redundancy version – 2 bits as defined in section x.x of [6. TS38.214]
HARQ process number – 4 bits
1$^{st}$ downlink assignment index – 1 or 2 bits
   1 bit for semi-static HARQ-ACK codebook;
   2 bits for dynamic HARQ-ACK codebook with single HARQ codebook
2$^{nd}$ downlink assignment index – 0 or 2 bits
   2 bits for dynamic HARQ-ACK codebook with two HARQ-ACK sub-codebooks;
   0 bit otherwise.
TPC command for scheduled PUSCH – 2 bits
SRS resource indicator $\left\lceil \log_2\left(\sum_{k=1}^{L_{max}} \binom{N_{SRS}}{k}\right)\right\rceil$ or $\lceil \log_2(N_{SRS}) \rceil$ bits
$\left\lceil \log_2\left(\sum_{k=1}^{L_{max}} \binom{N_{SRS}}{k}\right)\right\rceil$ bits for non-codebook-based PUSCH TABLE 4-continued transmission;
    $\lceil \log_2(N_{SRS}) \rceil$ bits for codebook-based PUSCH transmission
    Precoding information and number of layers – up to 6 bits
    Antenna ports – up to 5 bits
    SRS (sounding reference signal) request – 2 bits
    CSI request – 0, 1, 2, 3, 4, 5, or 6 bits
    CBG (code block group) transmission information – 0, 2, 4, 6, or 8 bits
    PTRS (phase tracking reference signal)-DMRS (demodulation reference signal) association – 2 bits
    beta_offset indicator – 2 bits
    DMRS sequence initialization – 0 or 1 bit
    UL/SUL indicator – 0 or 1 bit The fallback DCI for scheduling the PDSCH may include, for example, the information in [Table 5] below.

TABLE 5

Identifier for DCI formats - [1] bit
Frequency domain resource assignment -
$[\lceil \log_2(N_{RB}^{DL,\ BWP}(N_{RB}^{DL,\ BWP}+1)/2) \rceil]$ bits
Time domain resource assignment - X bits
VRB-to-PRB mapping - 1 bit
Modulation and coding scheme - [5] bits
New data indicator - 1 bit
Redundancy version - [2] bits
HARQ process number - [4] bits
Downlink assignment index - 2 bits
TPC command for scheduled PUCCH - [2] bits
PUCCH (physical uplink control channel) resource indicator - [2] bits
PDSCH-to-HARQ feedback timing indicator - [3] bits The non-fallback DCI for scheduling the PDSCH may include, for example, the information in [Table 6] below.

TABLE 6

Carrier indicator - 0 or 3 bits
Identifier for DCI formats - [1] bits
Bandwidth part indicator - 0, 1, or 2 bits
Frequency domain resource assignment
For resource allocation type 0, $\lceil N_{RB}^{DL,\ BWP}/P \rceil$ bits
For resource allocation type 1, $\lceil \log_2(N_{RB}^{DL,\ BWP}(N_{RB}^{DL,\ BWP}+1)/2 \rceil$ bits
Time domain resource assignment - 1, 2, 3, or 4 bits
VRB-to-PRB mapping - 0 or 1 bit, only for resource allocation type 1.
0 bit if only resource allocation type 0 is configured;
1 bit otherwise.
PRB (physical resource block) bundling size indicator
1 bit
Rate matching indicator - 0, 1, 2 bits
ZP (zero power) CSI-RS trigger - X bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 4 bits
TPC command for scheduled PUCCH - 2 bits
PUCCH resource indicator
PDSCH-to-HARQ feedback timing indicator - 3 bits
Antenna ports - up to 5 bits
Transmission configuration indication - 3 bits
SRS request - 2 bits
CBG transmission information - 0, 2, 4, 6, or 8 bits
CBG (code block group) flushing out information - 0 or 1 bit
DMRS sequence initialization - 0 or 1 bit The DCI may be transmitted through the PDCCH via a channel-coding and modulation process. A cyclic redundancy check (CRC) bit is added to a DCI message payload and is scrambled with a radio network temporary identifier (RNTI) corresponding to the identity of the UE. Depending on the purpose of the DCI message, for example, UE-specific data transmission, a power control command, or a random access response, different RNTIs are used. That is, the RNTI is not explicitly transmitted but is transmitted while being inserted into a CRC calculation process. If the DCI message transmitted through the PDCCH is received, the UE may identify the CRC through the allocated RNTI, and may recognize that the corresponding message is transmitted to the UE when the CRC is determined to be correct on the basis of the CRC identification result.

For example, DCI for scheduling the PDSCH for system information (SI) may be scrambled with an SI-RNTI. DCI for scheduling the PDSCH for a random access response (RAR) message may be scrambled with an RA-RNTI. DCI for scheduling the PDSCH for a paging message may be scrambled with a P-RNTI. DCI for providing notification of a slot format indicator (SFI) may be scrambled with an SFI-RNTI. DCI for providing notification of transmit power control (TPC) may be scrambled with a TPC-RNTI. DCI for scheduling a UE-specific PDSCH or PUSCH may be scrambled with a cell RNTI (C-RNTI).

When a specific UE receives scheduling of a data channel, that is, the PUSCH or the PDSCH through the PDCCH, data may be transmitted and received along with the DMRS within the corresponding scheduled resource region. FIG. 5 illustrates an example of the configuration of a downlink RB structure in the 5G system. In FIG. 5, a specific UE uses 14 OFDM symbols as 1 slot (or subframe) in the downlink, and a PDCCH (that is, downlink control information) 501 is transmitted through the first two OFDM symbols and a DMRS 502 is transmitted in a third symbol. In FIG. 5, PDSCHs (that is, downlink data) 503 are mapped to REs in which no DMRS is transmitted in a third symbol and to REs in fourth to last symbols and transmitted within a specific RB in which PDSCHs are scheduled. Subcarrier spacing Δf in FIG. 5 is 15 kHz in the LTE and LTE-A systems and uses one of (15, 30, 60, 120, 240, 480) kHz in the 5G system.

The LTE and LTE-A systems and the 5G system are designated to transmit and receive a control channel, a reference signal, and a data channel on the basis of the OFDM scheme. That is, the system is configured to convert a data symbol sequence $\{a_0, a_1, \ldots, a_{K-1}\}$ that includes information and is to be transmitted at each subcarrier location on the frequency axis into signals on the time axis via inverse Fourier transform and to transmit the signals in a given time interval. The expression of the OFDM signal on the time axis is as shown in [Equation 1] below.

$$s(t) = \sum_{k=0}^{k-1} a_k e^{j2\pi k \Delta f t} \cdot rect\left(\frac{t}{T}\right)$$

In [Equation 1], Of denotes subcarrier spacing, T denotes an OFDM symbol length, and rect(x) is defined as $$rect(t) = \begin{cases} 1 & 0 \leq x < 1 \\ 0 & \text{elsewhere} \end{cases}.$$

The OFDM signal of [Equation 1] on the frequency axis is indicated in the form of convolution of a sinc signal and an impulse train of the data symbol sequence $\{a_0, a_1, \ldots, a_{K-1}\}$ transmitted in subcarriers having spacing Δf, as shown in [Equation 2] below.

$$S(f) = \mathcal{F}\{s(t)\} = \left[\sum_{k=0}^{K-1} a_k \delta(f - k\Delta f)\right] \otimes \text{sinc}(Tf) \quad \text{[Equation 2]}$$

In [Equation 2], F{·} denotes Fourier transform of a signal on the time axis, and δ(·) is a Dirac delta function indicating an impulse. sinc(x)=(sin(πx))/πx, and ⊗ denotes convolution. FIG. 6 illustrates the OFDM signal on the frequency axis, and all values of $a_k$ of [Equation 2] are the same as each other.

FIG. 6 illustrates an OFDM frequency-axis signal function. As shown in FIG. 6, in order to prevent a signal transmitted in a specific subcarrier from influencing other subcarriers, it will be obvious that Δf=1/T should be satisfied in [Equation 1] and [Equation 2] above, and accordingly [Equation 3] corresponds to a zero ICI condition that eliminates inter-carrier interference (ICI).

$$\Delta f = \frac{1}{T} \quad \text{[Equation 3]}$$

That is, in the case of an OFDM system applied to the LTE, LTE-A, and 5G systems, if subcarrier spacing is determined, the OFDM symbol length is also determined according to [Equation 3]. Accordingly, when a frequency bandwidth (BW) in which an OFDM symbol is transmitted and an OFDM symbol length (T) are determined, the number of subcarriers that can be transmitted is not larger than BW×T, and accordingly, the amount of data that can be transmitted with respect to the given symbol length (T) is determined in proportion to the corresponding number of subcarriers.

Hereinafter, embodiments of the disclosure will be described in detail with reference to the accompanying drawings. The following embodiments of the disclosure are described on the basis of the LTE and LTE-A systems by way of example, but the embodiments of the disclosure can be applied to other communication systems having a similar technical background or channel form. For example, $5^{th}$-generation mobile communication technology (5G, new radio, or NR), developed after LTE-A, may be included therein. That is, embodiments of the disclosure can be applied to other communication systems through some modifications based on a determination by those skilled in the art without departing from the scope of the disclosure.

In the following description of the disclosure, a detailed description of known functions or configurations incorporated herein will be omitted when the same may make the subject matter of the disclosure rather unclear. The terms used below are terms defined in consideration of the functions in the disclosure, and may differ according to users, intentions of the users, or customs. Therefore, the definitions of the terms should be made based on the contents throughout the specification.

As described above, in the case of the OFDM system applied to the LTE, LTE-A, and 5G systems, if subcarrier spacing is determined, the OFDM symbol length is also determined according to [Equation 3]. Accordingly, when the frequency bandwidth (BS) in which the OFDM signal can be transmitted and the OFDM symbol length (T) are given, the number of subcarriers that can be transmitted is not larger than BW×T=BW/Δf, and accordingly, the amount of data that can be transmitted through one OFDM symbol having a specific length is limited. For example, when a bandwidth of 20 MHz is used in the LTE and LTE-A systems supporting subcarrier spacing of 15 kHz, it is determined that 1200 subcarriers are transmitted. When subcarrier spacing of 15 kHz and a bandwidth of 20 MHz are used in the 5G system, it is determined that 1272 subcarriers are transmitted.

The disclosure considers a method by which a transmitter may transmit much more data in a given frequency band by transmitting a signal having subcarrier spacing smaller than 1/T in the symbol length (T) while [Equation 3], corresponding to the condition under which ICI does not exist in the OFDM, is not satisfied. That is, in the embodiment of the disclosure, a squeezing factor ζ, which is smaller than 1, is introduced, and a multi-subcarrier signal, generated to have subcarrier spacing ζΔf, is transmitted in the symbol length T=1/Δf, and thus more subcarriers may be transmitted in a given time interval. The system considered by embodiments of the disclosure is referred to as a non-orthogonal frequency-division modulation (NOFDM) system since the system uses a signal as shown in [Equation 4] below and does not guarantee orthogonality between subcarriers.

$$s(t) = \sum_{k=0}^{K-1} a_k e^{j2\pi k \zeta \Delta f t} \cdot \text{rect}\left(\frac{t}{T}\right) \quad \text{[Equation 4]}$$

In [Equation 4], T=1/Δf and ζ<1 are satisfied.

Referring to [Equation 4], subcarrier spacing for data transmission is ζΔf, but the symbol length is T=1/Δf in the NOFDM system considered in embodiments of the disclosure, and thus inter-subcarrier interference occurs but a larger number of subcarriers may be used within the same frequency bandwidth for the given symbol length T. That is, in the case of the system considered by embodiments of the disclosure, there is inter-subcarrier interference but a number of subcarriers larger by 1/ζ times may be used within the same frequency bandwidth compared to the conventional OFDM system.

FIG. 7 illustrates a frequency-axis signal difference between an NOFDM signal and an OFDM signal. FIG. 7 shows the difference between the NOFDM signal and the OFDM signal according to [Equation 4]. In an OFDM signal 700, a data symbol is mapped and transmitted at an interval of Δf on the frequency axis, and another subcarrier signal has a value of 0 at each subcarrier location, and thus orthogonality without inter-carrier interference (ICI) is guaranteed, as indicated by reference numeral 710. On the other hand, in an NOFDM signal 720, a data symbol is mapped and transmitted at an interval off on the frequency axis, and another subcarrier signal has a nonzero value at each subcarrier location, and thus ICI occurs between subcarriers and orthogonality is not guaranteed, as indicated by reference numeral 730. Accordingly, the NOFDM signal may transmit 1/ζ times as many subcarriers as the OFDM signal using the same time and frequency bandwidth, but a receiver is faced with additional reception complexity for removing ICI. FIG. 8 illustrates symbol interval difference between an NOFDM signal and an OFDM signal. FIG. 8 also shows that the NOFDM signal may transmit 1/ζ times more subcarriers in the same time interval and the same frequency band compared to the OFDM signal but have ICI. Referring to FIG. 8, subcarrier spacing 810 is Δf in the case of OFDM 800 and subcarrier spacing 830 is ζΔf in the case of NOFDM 820, in which case respective subcarriers have overlapping intervals.

As described above, since orthogonality is not guaranteed between subcarriers in the case of NOFDM, in order to receive a data symbol transmitted in a specific subcarrier, the data symbol should be combined with data symbols for neighboring subcarriers generating interference to be received. More specifically, when a data symbol $a_k$ transmitted in a $k^{th}$ subcarrier is detected using NOFDM, other neighboring subcarriers act as interference, and the data symbol should be detected in consideration of all subcarriers transmitted in a specific time interval in theory. [Equation 5] is an equation indicating an optimal detection method of detecting data symbols when the NOFDM signal of [Equation 4] is transmitted by the transmitter and a signal received by the receiver through a channel is R, and the corresponding method may be implemented through various approximate and repetitive algorithms.

$$\{\hat{\alpha}_0, \hat{\alpha}_1, \ldots, \hat{\alpha}_{K-1}\} = \mathrm{argmax}_{(\alpha_0, \ldots, \alpha_{K-1}) \in \mathbb{A}^K} P(\alpha_0, \ldots, \alpha_{K-1} | R)$$ [Equation 5]

In [Equation 5], P(X|Y) denotes a probability function of X when Y is given, $\mathbb{A}$ denotes a set of available values of the data symbol, and $\mathbb{A}^K$ denotes a set of all available vectors of the size K included in each element $\mathbb{A}$. According to the document, when a receiver based on [Equation 5] is received in the state in which ζ is larger than or equal to 0.8, the NOFDM signal may have performance that almost matches the state in which there is no ICI.

Embodiment 1

In <Embodiment 1> of the disclosure, the PDCCH and the DMRS use OFDM and the data uses NOFDM to transmit and receive data in the state in which there are the symbol including the control channel, the symbol including the DMRS, and the symbol having only data, as illustrated in FIG. 5. In addition, data that is transmitted with the PDCCH or the DMRS through different subcarriers (FDM) on the frequency within the same symbol may use OFDM. In general, the PDCCH includes information indicating whether data scheduling to a specific UE occurs and the corresponding scheduling information, thereby significantly influencing the reliability of the entire system and the average delay time. Accordingly, it is better to use OFDM, having low reception complexity due to orthogonality. Further, the DMRS is used to estimate a channel of the receiver, and is used to distinguish antenna ports in MIMO transmission, and thus it is natural to use OFDM for the entire system operation. On the other hand, since an accurate transmission scheme is transmitted to the UE through scheduling information and a larger amount of data must be included, it is better to transmit data through NOFDM, as shown in [Equation 4], having high frequency efficiency.

FIG. 9 illustrates an example of an RB structure in the case in which the NOFDM signal and the OFDM signal are time-division multiplexed. FIG. 9 illustrates an example of a method in which REs of a PDCCH 901, a DMRS 902, and a PDSCH 903 or 904 are mapped and multiplexed on time and frequency axes in the downlink of a system in which OFDM and NOFDM, considered in <Embodiment 1>, are combined. When the OFDM signal and the NOFDM signal are combined, the RB size, which is the unit of scheduling of the UE and signal transmission, needs to be designed to match in time and frequency intervals for efficient operation of the system. That is, as identified through [Equation 1] and [Equation 4] above, the time-axis structures of OFDM and NOFDM match each other, and thus separate division is not needed to configure a slot, but subcarrier spacings on the frequency axis are different, so the number of subcarriers included in one RB needs to follow [Equation 6] below.

$$N_{RB\_OFDM} = \zeta N_{RB\_NOFDM}$$ [Equation 6]

In [Equation 6], $N_{RB\_OFDM}$ denotes the number of OFDM subcarriers within one RB, and $N_{RB\_NOFDM}$ denotes the number of NOFDM subcarriers within one RB.

When 12 OFDM subcarriers correspond to one RB, as in the LTE, LTE-A, and 5G systems, the system may be designed such that one RB includes 15 subcarriers in consideration of ζ of 0.8 in the case of NOFDM, as indicated by reference numeral 910 of FIG. 9. Further, as described above, in FIG. 9, the PDCCH 901 or the DMRS 902 uses OFDM, and the PDSCH 904 uses NOFDM. In addition, PDSCHs 903 frequency-division multiplexed with the PDCCH or the DMRS use OFDM. That is, OFDM is used for transmission of the PDSCH mapped to a symbol to which the PDCCH or the reference signal is mapped. As described above, the OFDM and NOFDM signals do not need a change in the time-axis structure, and thus the system may operate such that 14 OFDM symbols form a basic slot, as in the LTE, LTE-A, and NR systems.

FIG. 10 illustrates another example of the RB structure in the case in which the NOFDM signal and the OFDM signal are time-division multiplexed. When 12 OFDM subcarriers correspond to one RB, as in the LTE, LTE-A, and 5G systems, the system may be designed such that one RB includes 20 subcarriers in consideration of ζ of 0.6 in the case of NOFDM according to [Equation 6] as indicated by reference numeral 1010 of FIG. 10. Further, as described above, in FIG. 10, the PDCCH 1001 or the DMRS 1002 uses OFDM, and the PDSCH 1004 uses NOFDM. In addition, PDSCHs 1003 frequency-division multiplexed with the PDCCH 1001 or the DMRS 1002 use. OFDM. As described above, the OFDM and NOFDM signals do not need a change in the time-axis structure, and thus the system may operate such that 14 OFDM symbols form a basic slot, as in the LTE, LTE-A, and NR systems.

FIGS. 9 and 10 illustrate that the PDCCH is transmitted in the first two OFDM symbols and the DMRS is transmitted thereafter, but the disclosure is not limited thereto, and the PDCCH may be transmitted in 0 or more OFDM symbols and the DMRS may be transmitted in one or more OFDM symbols. According to an embodiment of the disclosure, PDSCHs frequency-division multiplexed with the PDCCH or the DMRS equally use OFDM regardless of the number of OFDM symbols used by the DMRS and the PDCCH. Otherwise, data may be transmitted through NOFDM. Further, according to an embodiment of the disclosure, only the DMRS is described by way of example, but the disclosure is not limited thereto, and a channel state information reference signal (CSI-RS) frequency-division multiplexed with the PDSCH may be transmitted through OFDM even when the CSI-RS used for channel estimation of the UE and the PDSCH are frequency-division multiplexed. In addition, the same principle may be applied to a primary synchronization signal, a secondary synchronization signal, and a physical broadcast channel (PBCH). That is, although data is transmitted and received through NOFDM, at least one of the signal and the channel may be transmitted and received through OFDM, and OFDM may be applied to data transmitted through FDM with the signal and the channel.

FIG. 11 illustrates an operation in which the UE receives the PDSCH according to <Embodiment 1> of the disclosure. Referring to FIG. 11, the UE identifies reception of the PDSCH through NOFDM, corresponding to [Equation 4] in step 1101. The UE identifies reception of the PDSCH through NOFDM using the following method. Information on whether NOFDM can be used may be included in RRC information that the eNB transmits to the UE, and information indicating whether the UE uses NOFDM in a scheduled slot may be further included in DCI of the PDCCH. That is, through RRC configuration, the UE may identify the use of NOFDM, in which case PDSCH transmission using NOFDM is performed in all slots. Alternatively, according to RRC configuration, when the use of NOFDM is turned on, whether to use NOFDM in the slot scheduled by the DCI may be indicated by the DCI. Further, the UE may identify whether to use NOFDM according to DCI through which the PDSCH is scheduled. For example, OFDM may always be used in the case of the PDSCH scheduled through fallback DCI, and NOFDM may be used in the case of the PDSCH scheduled through non-fallback DCI. Further, before step 1101, the UE may insert information indicating that the UE itself can support PDSCH reception using NOFDM into UE capability information and report the UE capability information to the eNB, and the eNB may indicate whether the PDSCH reception using NOFDM is performed to the UE through RRC information and/or DCI.

The UE identifying the PDSCH reception using NOFDM in step 1101 identifies whether each symbol in which the PDSCH is transmitted within the slot is frequency-division multiplexed with a control channel or a reference signal in step 1102. The control channel may be the PDCCH, and the reference signal may be the DMRS, but they are not limited thereto. When each symbol in which the PDSCH is transmitted is frequency-division multiplexed with the control channel or the reference signal, the UE receives the PDSCH on the basis of the assumption that OFDM is used in step 1113. On the other hand, when the PDSCH is not frequency-division multiplexed and is mapped to the corresponding symbol, the UE receives the PDSCH on the basis of the assumption that NOFDM is used in step 1103.

FIG. 12 illustrates an operation in which the eNB transmits the PDSCH according to <Embodiment 1> of the disclosure. Referring to FIG. 12, the eNB identifies whether the PDSCH is transmitted through NOFDM corresponding to [Equation 4] in step 1201. That is, it is identified whether the UE scheduled in the corresponding slot is a UE capable of receiving the PDSCH through NOFDM. Step 1201 may be performed on the basis of information indicating that the PDSCH can be received using NOFDM through a UE capability report. Thereafter, in step 1202, the eNB identifies whether each symbol in which the PDSCH is transmitted within the slot is frequency-division multiplexed with a control channel or a reference signal. That is, it is identified whether there is a control channel or a reference signal mapped to the symbol in which the PDSCH is transmitted. When each symbol in which the PDSCH is transmitted within the slot is frequency-division multiplexed with the control channel or the reference signal, the eNB may transmit the PDSCH through OFDM, and may also transmit corresponding scheduling information for downlink data through OFDM in step 1204. When the PDSCH is not frequency-division multiplexed and only the PDSCH is mapped to the corresponding symbol (that is, when there is no control channel or reference signal mapped to the symbol in which the PDSCH is transmitted), the eNB may transmit the PDSCH through the NOFDM, and may also transmit corresponding scheduling information for downlink data through NOFDM in step 1203.

<Embodiment 1> has mainly described the PDSCH transmission/reception operation of the UE and the eNB in the downlink, but the multiplexing operation of the OFDM signal and the NOFDM signal may be applied through the same method with only a change in the transmission/reception subject in the case of the PUSCH.

Further, unlike the above-described technology, a reference signal in a data region other than the PDCCH may be transmitted through NOFDM. That is, at least one of the DMRS, the CSI-RS, the SS, and the PBCH may be transmitted through NOFDM. In this case, when NOFDM is used, the number of subcarriers within one RB increases by $N_{RB\_OFDM}/\zeta$, and accordingly, the sequence length may be generated by reflecting the number of subcarriers of NOFDM and mapped to the increased number of subcarriers when the DMRS sequence is generated.

Embodiment 2

<Embodiment 2> of the disclosure describes a detailed method by which the UE or the eNB generates the OFDM signal of [Equation 1] and the NOFDM signal of [Equation 4] when OFDM and NOFDM symbols are time-division multiplexed (TDM) and configure one specific slot, as illustrated in FIG. 9 or 10.

FIG. 13 illustrates the operation of a transmitter for generating the OFDM or NOFDM signal. The operation of the transmitter for generating the signal of [Equation 1] or [Equation 4] above is described with reference to FIG. 13. The transmitter first selects a value of N that satisfies $N=2^m$ (m being a natural number) larger than or equal to K corresponding to the number of subcarriers, and then acquires a sequence of signals $\{A_0, A_i, \ldots, A_{N-1}\}$ sampled on the time axis through the inverse fast Fourier transform (IFFT) operation having the size of N for a symbol sequence $\{a_0, a_1, \ldots, a_{K-1}\}$ step 1301. IFFT is a well-known technology, and is an algorithm for rapidly implementing inverse discrete Fourier transform (IDFT) according to [Equation 7] below.

$$X_k = \sum_{n=0}^{N-1} x_n e^{j2\pi kn/N}, k = 0, 1, \ldots, N-1 \quad \text{[Equation 7]}$$

In step 1302, the transmitter acquires an oversampled sequence $\{A_0, A_0, A_0, A_1, \ldots A_1, A_1, \ldots, A_{N-1}, A_{N-1}, \ldots\}$ by repeating $M_{over}$ times each sequence value of the sequence $\{A_0, A_1, \ldots, A_{N-1}\}$ sampled on the time axis. At this time, each sequence value of the sequence sampled on the time axis is repeated $M_{over}$ times, and thus the oversampled sequence is generated. That is, the oversampled sequence includes each sequence value $M_{over}$ times, for example, $M_{over} A_0$. In step 1303, an operation of a digital-to-analog converter (DAC) having a sampling period of $T_s$ is performed. In order to place the symbol sequence $\{a_0, a_1, \ldots, a_{K-1}\}$ an interval of on the frequency axis, the sampling period of the DAC should be configured as $T_s=1/(\zeta\Delta NM_{over})$. The analog signal on the time axis acquired in step 1303 is transmitted between [0, T] by the transmitter in step 1304, which indicates an effect of generating the signal of [Equation 4] in step 1305.

In the process of FIG. 13, since the case of $\zeta=1$ corresponds to an OFDM signal generation process and the case of $\zeta<1$ corresponds to an NOFDM signal generation process, it may be noted that OFDM and NOFDM signals are generated through a series of common processes. However, in a detailed description of FIG. 13, the OFDM signal generation process and NOFDM signal generation process may differ with regard to an IFFT size selection process and a $T_s$ selection process in step 1301.

[Table 7] below shows the number of subcarriers in a system for a frequency bandwidth supported by the 5G system using subcarrier spacing of 15 kHz and the number of subcarriers supported by the NOFDM system in the case of $\zeta$=0.8. In step 1301 of FIG. 13, for the IFFT size N, a minimum value among values of $2^m$ larger than K is generally selected to guarantee low complexity. In a more detailed description of the difference between OFDM and the NOFDM with reference to [Table 7], the OFDM system and the NOFDM system use in common 512, 1024, 2048, 2048, 4096, and 4096 as the IFFT size N when a bandwidth (BW) is 5, 10, 20, 25, 40, and 50 MHz, but the OFDM system uses 1024 IFFT when the bandwidth is 15 MHz and the NOFDM system uses 2048 IFFT, and accordingly the IFFT sizes used thereby are different. Accordingly, in order to prevent a change in the IFFT size within the same slot, a minimum value among values of $2^m$ larger than K for NOFDM should always be selected as the IFFT size when OFDM and NOFDM symbols are time-division multiplexed and configure one specific slot as illustrated in FIG. 9 or 10. That is, when the bandwidth is 15 MHz, 2048 should be used as the IFFT size.

TABLE 7

| | BW(MHz) | | | | | | |
|---|---|---|---|---|---|---|---|
| | 5 | 10 | 15 | 20 | 25 | 40 | 50 |
| OFDM(15 kHz) | 300 | 624 | 948 | 1272 | 1596 | 2592 | 3240 |
| NOFDM(12 kHz) | 375 | 780 | 1185 | 1590 | 1995 | 3240 | 4050 |

In step 1303 of FIG. 13, the sampling period should be configured as $T_s=1/(\zeta \Delta f N M_{over})$, and in order to prevent a change in the sampling period of the DAC within the same slot, an oversampling value $Mo_{ver-OFDM}$ for the OFDM symbol and an oversampling value $M_{over-NOFDM}$ for the NOFDM symbol, selected in step 1302 of FIG. 13, should be selected to satisfy $\zeta M_{over-NOFDM}=M_{over-OFDM}$ when OFDM and NOFDM symbols are time-division multiplexed and configure one specific slot, as illustrated in FIG. 9 or 10. Specifically, the relationship $0.8M_{over-NOFDM}=M_{over-OFDM}$ is established when $\zeta$ is 0.8, and the relationship $0.6M_{over-NOFDM}=M_{over-OFDM}$ is established when $\zeta$ is 0.6. Accordingly, the sampling period of the DAC is not changed even though OFDM or NOFDM is used. Further, although the embodiment describes the case in which $\zeta$ is 0.8 or 0.6, the value of $\zeta$ is not limited thereto. The main subject of the disclosure may be equally applied to another value of $\zeta$ (for example, 0.5), which is not described in the disclosure.

In order to implement the embodiments of the disclosure, a transmitter, a receiver, and a controller of each of the UE and the eNB are illustrated in FIGS. 14 and 15. The embodiment exemplifies the transmission/reception method of the eNB and the UE to apply the method of transmitting/receiving the downlink control channel and the data channel in the communication system, and the transmitter, the receiver, and the controller of each of the eNB and the UE should operate according to each embodiment to perform the method.

Specifically, FIG. 14 is a block diagram illustrating the internal structure of the UE according to an embodiment of the disclosure. As illustrated in FIG. 14, the UE according to the disclosure may include a UE controller 1401, a receiver 1402, and a transmitter 1403.

The UE controller 1401 may control a series of processes such that the terminal operates according to the above-described embodiments of the disclosure. For example, the UE controller 1401 may generate and process a signal according to a method of receiving a downlink control channel and transmitting/receiving a reference signal and a data channel through OFDM and NOFDM signals according to an embodiment of the disclosure, and may differently control the receiver 1402 and the transmitter 1403. The UE receiver 1402 and the UE transmitter 1403 may be collectively referred to as a transceiver in embodiments of the disclosure. The transceiver may transmit and receive a signal to and from the eNB. The signal may include control information and data. To this end, the transceiver may include an RF transmitter that upconverts and amplifies the frequency of a transmitted signal, an RF receiver that low-noise amplifies a received signal and downconverts the frequency, and the like. Also, the transceiver may receive a signal through a radio channel, output the signal to the UE controller 1401, and transmit the signal output from the UE controller 1401 through the radio channel.

FIG. 15 is a block diagram illustrating the internal structure of the eNB according to an embodiment of the disclosure. As illustrated in FIG. 15, the eNB according to the disclosure may include an eNB controller 1501, a receiver 1502, and a transmitter 1503.

The eNB controller 1501 may control a series of processes such that the eNB operates according to the above-described embodiments of the disclosure. For example, the eNB controller 1501 may allocate and transmit a downlink control channel through OFDM and NOFDM signals according to an embodiment of the disclosure, generate and process a signal according to a method of mapping and transmitting/receiving an RS and data channel resources, and control the receiver 1502 and the transmitter 1503 differently. The eNB receiver 1502 and the eNB transmitter 1503 are commonly called a transceiver in the embodiments of the disclosure. The transceiver may transmit and receive a signal to and from the UE. The signal may include control information and data. To this end, the transceiver may include an RF transmitter that upconverts and amplifies the frequency of a transmitted signal, an RF receiver that low-noise amplifies a received signal and downconverts the frequency, and the like. Also, the transceiver may receive a signal through a radio channel, output the signal to the eNB controller 1501, and transmit the signal output from the eNB controller 1501 through the radio channel.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary.

What is claimed is:

1. A method of transmitting a signal by an eNB; the method comprising:
   identifying whether to use non-orthogonal frequency-division multiplexing (NOFDM) in downlink data transmission; and transmitting, to a UE, downlink control information and a reference signal through orthogonal frequency-division multiplexing (OFDM) and transmitting downlink data through the NOFDM or the OFDM in case that the NOFDM is used in the downlink data transmission.

2. The method of claim 1, further comprising transmitting, to the UE, an RRC message including information indicating that the NOFDM is used in the downlink data transmission.

3. The method of claim 1, wherein the reference signal includes at least one of a demodulation reference signal (DMRS) and a channel state information reference signal (CSI-RS).

4. The method of claim 1, wherein, in case that the downlink control information or the reference signal is mapped to a symbol in which the downlink data is transmitted, the OFDM is used for transmission of the downlink data mapped to the symbol, and in case that the downlink control information or the reference signal is not mapped to the symbol in which the downlink data is transmitted, the NOFDM is used for transmission of the downlink data mapped to the symbol.

5. A method of receiving a signal by a UE, the method comprising:

identifying whether to use non-orthogonal frequency-division multiplexing (NOFDM) in downlink data reception; and receiving, from an eNB, downlink control information and a reference signal through orthogonal frequency-division multiplexing (OFDM) and receiving downlink data through the NOFDM or the OFDM in case that the NOFDM is used in the downlink data reception.

6. The method of claim 5, further comprising receiving, from the eNB, an RRC message including information indicating that the NOFDM is used in the downlink data reception.

7. The method of claim 5, wherein the reference signal includes at least one of a demodulation reference signal (DMRS) and a channel state information reference signal (CSI-RS).

8. The method of claim 5, wherein, in case that the downlink control information or the reference signal is mapped to a symbol in which the downlink data is transmitted, the OFDM is used for reception of the downlink data mapped to the symbol, and in case that the downlink control information or the reference signal is not mapped to the symbol in which the downlink data is transmitted, the NOFDM is used for reception of the downlink data mapped to the symbol.

9. An eNB for transmitting a signal, the eNB comprising:
a transceiver; and
a controller is coupled with the transceiver and configured to:
identify whether to use non-orthogonal frequency-division multiplexing (NOFDM) in downlink data transmission, and
transmit, to a UE, downlink control information and a reference signal through orthogonal frequency-division multiplexing (OFDM) and transmitting downlink data through the NOFDM or the OFDM in case that the NOFDM is used in the downlink data transmission.

10. The eNB of claim 9, wherein the controller is further configured to transmit, to the UE, an RRC message including information indicating that the NOFDM is used in the downlink data transmission.

11. The eNB of claim 9, wherein the reference signal includes at least one of a demodulation reference signal (DMRS) and a channel state information reference signal (CSI-RS).

12. The eNB of claim 9, wherein the OFDM is used for transmission of the downlink data mapped to the symbol in case that the downlink control information or the reference signal is mapped to a symbol in which downlink data is transmitted, and the NOFDM is used for transmission of the downlink data mapped to the symbol in case that the downlink control information or the reference signal is not mapped to the symbol in which the downlink data is transmitted.

13. A UE for receiving a signal, the UE comprising:
a transceiver; and
a controller is coupled with the transceiver and configured to:
identify whether to use non-orthogonal frequency-division multiplexing (NOFDM) in downlink data reception, and
receive, from an eNB, downlink control information and a reference signal through orthogonal frequency-division multiplexing (OFDM) and receive downlink data through the NOFDM or the OFDM in case that the NOFDM is used in the downlink data reception.

14. The UE of claim 13, wherein the controller is further configured to receive, from the eNB, an RRC message including information indicating that the NOFDM is used in the downlink data reception.

15. The UE of claim 13, wherein, the OFDM is used for transmission of downlink data mapped to the symbol in case that the downlink control information or the reference signal is mapped to a symbol in which the downlink data is transmitted, and the NOFDM is used for transmission of the downlink data mapped to the symbol in case that the downlink control information or the reference signal is not mapped to the symbol in which the downlink data is transmitted.

* * * * *